F. A. DECKER.
ELECTRIC BATTERY
APPLICATION FILED JUNE 20, 1907. RENEWED NOV. 11, 1909.

957,192.

Patented May 10, 1910.

WITNESSES:

INVENTOR
Frank A. Decker
BY
Chas. N. Butler
ATTORNEY.

UNITED STATES PATENT OFFICE.

FRANK A. DECKER, OF PHILADELPHIA, PENNSYLVANIA, ASSIGNOR TO DECKER ELECTRICAL MANUFACTURING COMPANY, OF WILMINGTON, DELAWARE, A CORPORATION OF DELAWARE.

ELECTRIC BATTERY.

957,192.     Specification of Letters Patent.     Patented May 10, 1910.

Application filed June 20, 1907, Serial No. 379,835.    Renewed November 11, 1909. Serial No. 527,570.

*To all whom it may concern:*

Be it known that I, FRANK A. DECKER, a citizen of the United States, residing at Philadelphia, in the county of Philadelphia and State of Pennsylvania, have invented certain Improvements in Electric Batteries, of which the following is a specification.

This invention in a battery having improved mechanism by which fluid connections, disconnections and changes can be made with facility, the mechanism comprising conduit couplings providing revoluble, self-adjusting and fluid proof joints.

In the preferred form of the invention, the cells are mounted to reciprocate vertically in relation to a fluid supply tank to which they are coupled and uncoupled for the purpose of irrigation or changing the fluid from one to the other and the tank is provided with a revoluble conduit for filling and emptying it.

Figure 1:
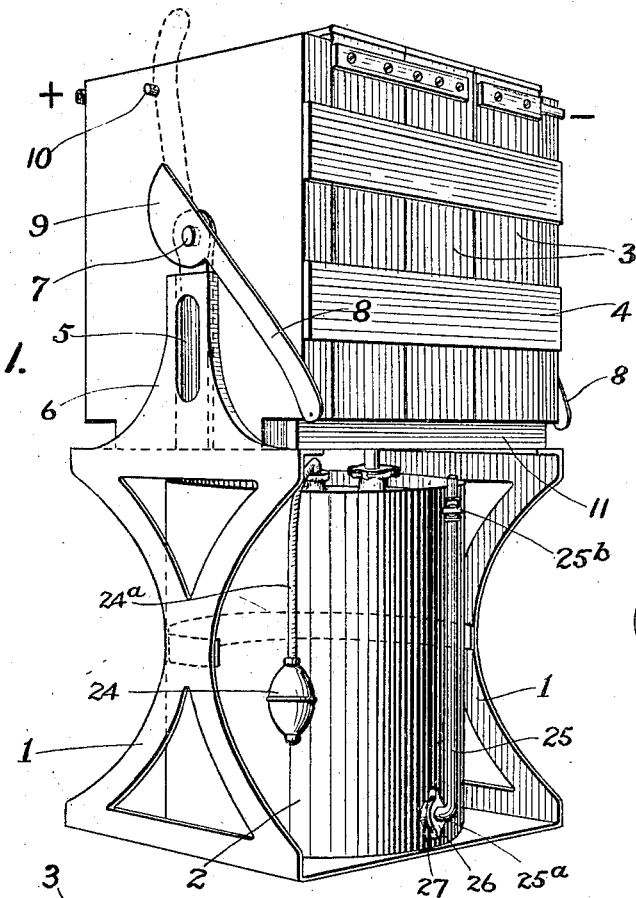
Figure 3:
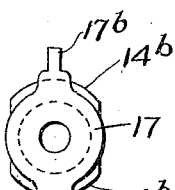
Figure 2:
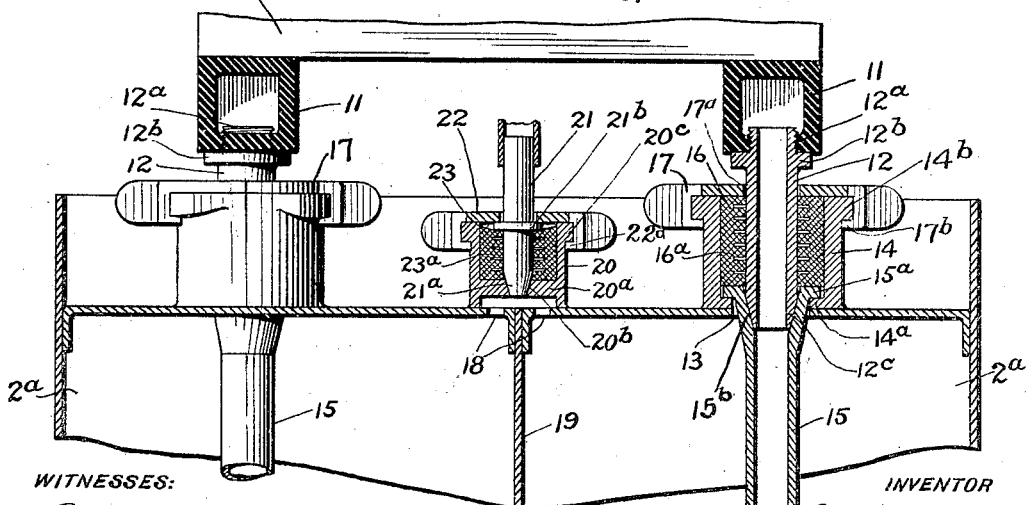

In the drawings, Figure 1 is a perspective view of a battery embodying the invention; Fig. 2 is a vertical sectional view showing the connections between the cells and tank and the connection of the pump with the tank, and Fig. 3 is a plan view of a coupling.

In the drawings are shown a stand or frame 1, a tank 2 adapted to be moved into and out of the frame, and the cells 3 supported by the crate or casing 4, the casing and cells being carried by the stand above the tank. The casing 4 has vertical guides 5 on the ends thereof, which are movable in vertical ways or guiding standards 6 on the stand 1. The casing is provided, at the ends thereof, with journals 7 for levers 8, the latter having cams 9 which engage the tops of the standards. By elevating and lowering the levers, the casing and cells are elevated and lowered, and by throwing the levers past the vertical position, against the pins 10 in the ends of the casing, the casing and cells will be held in the elevated position, when the tank can be removed or replaced conveniently.

The conduits 11, which connect the cells, have connected thereto the nipples 12, with threads $12^a$ for making the connections, flanges $12^b$ for providing bearings with the conduits, and tapered ends $12^c$ for securing a wedging engagement with a correspondingly formed seat.

Apertures 13 in the top of the tank are surrounded by the hollow bosses or boxes 14 having the internal flanges $14^a$ at their bottoms and the external tapered flanges or cams $14^b$ at their tops. Tubes 15, extending through the apertures into the tank, have top flanges $15^a$ which engage the flanges $14^a$ and tapered seats $15^b$ which receive the tapered nipple ends $12^c$. Rubber packing rings 16, having the recesses $16^a$ for holding a lubricator, as graphite, surround the nipples 12 within the bosses or boxes 14. Caps 17 cover the bosses and compress and hold the packings in place, the caps having the apertures $17^a$ for the nipples, and the clips $17^b$ for engaging the cams or tapered flanges $14^b$.

It will be understood that when lifted the battery cells are withdrawn from their frictional engagement with the tank and on lowering the cells the engagement is made and maintained by the weight of the battery.

Apertures 8, in the top of the tank on either side of the partition 19, are surrounded by a hollow boss or box 20 fixed to the top of the tank. This box has the bottom $20^a$, with the tapered seat $20^b$ passing therethrough, and the external top flanges $20^c$ similar to the flanges $14^b$. A nipple 21, having the tapered end $21^a$ forming a wedging engagement with the seat $20^b$, is provided with a flange $21^b$ and held in place by the engagement of the cap 22 with the flange, the cap having the clips $22^a$ interlocking with the cams $20^c$. Surrounding the nipple 21, within the boss or box 20, is the rubber packing 23 having the recesses $23^a$ for holding a lubricator, the packing being pressed and held by the action of the cap.

Air is forced through the nipple 21 and the apertures 18 to lift the battery fluids in the tank compartments $2^a$ through the tubes 15, the nipples 12 and the channels 11 into the cells; the air being supplied in any suitable manner as by a bulb 24 and a hose $24^a$ connected with the nipple 21.

Preferably the tubes 15 are loose, being removable on removing the packings 16, and have a length regulated to permit the proper amount of solution for the battery to be lifted through them from the tank by fluid pressure communicated thereto.

The bottom of the tank may have a tube 25 connected therewith in rotatable relation by a nipple $25^a$ on the tube clamped by a cap 26 to a boss 27 on the tank; the nipple, cap and boss being similar respectively to the nipple 21, the cap 22 and the boss 20 and the joint being packed by a rubber sleeve or gasket similar to the packing 23. The tube 25 is thus provided with a revoluble connection with the tank, by which it can be elevated and lowered to fill and empty therethrough, having the valve 25ᵇ to control its passage.

Having described my invention, I claim:—

1. A battery having a nipple connected with its bottom and communicating with its interior, a tank having fixed thereto a box containing a hollow packing within which said nipple fits, a tube connected with said nipple and extending into said tank, and mechanism connected with said tank for forcing liquid therefrom through said tube and nipple into said battery.

2. A battery having a nipple communicating with the interior thereof, a tank having fixed thereon a box containing a hollow packing within which said nipple fits, said box having cams thereon and a cap having clips engaging said cams, a tube communicating with said nipple and extending into said tank, and mechanism connected with said tank for forcing liquid through said tube and nipple into said battery.

3. A battery, a frame, mechanism for reciprocating said battery in said frame, a tank, means whereby fluid connection is established and broken between said battery and tank through the operation of said mechanism, and means for forcing fluid from said tank into said battery.

4. A battery, a frame, ways for guiding the movements of said battery relatively to said frame, a lever whereby said battery is moved relatively to said frame, a tank held in said frame, and means whereby fluid connection is made and broken between said tank and battery.

5. A battery, a frame, ways for guiding the movements of said battery relatively to said frame, levers having cams thereon for moving said battery in said frame, a tank held in said frame, and means whereby fluid connection is made and broken between said tank and battery on moving the latter.

6. In a battery, one or more cells, a tank containing a tube having a detachable connection therewith and with said cell or cells, means for forcing liquid from said tank through said tube into said cell or cells and means for reciprocating said cell or cells.

In testimony whereof, I have hereunto set my name this 13th day of June, A. D. 1906, in the presence of the subscribing witnesses.

FRANK A. DECKER.

Witnesses:
   FRANCIS B. CROCKER,
   CHARLES N. BUTLER.